(12) United States Patent
Börnchen et al.

(10) Patent No.: US 6,837,544 B2
(45) Date of Patent: Jan. 4, 2005

(54) ADJUSTER MECHANISM FOR SETTING THE HEIGHT OF AN ARMREST ON A MOTOR VEHICLE DOOR

(75) Inventors: Thomas Börnchen, Bamberg (DE); Martin Schlechtriemen, Hallstadt (DE); Werner Stammberger, Weissenbrunn (DE); Frank Wagner, Nuremberg (DE)

(73) Assignee: Brose Fahrzeugteile GmbH & Co. KG, Coburg, Coburg (DE)

(*) Notice: Subject to any disclaimer, the term of this patent is extended or adjusted under 35 U.S.C. 154(b) by 0 days.

(21) Appl. No.: 10/433,724

(22) PCT Filed: Dec. 6, 2001

(86) PCT No.: PCT/DE01/04678
§ 371 (c)(1),
(2), (4) Date: Jun. 3, 2003

(87) PCT Pub. No.: WO02/45996
PCT Pub. Date: Jun. 13, 2002

(65) Prior Publication Data
US 2004/0100136 A1 May 27, 2004

(30) Foreign Application Priority Data

Dec. 6, 2000 (DE) .......................... 100 60 857
Jan. 29, 2001 (DE) .......................... 101 04 077

(51) Int. Cl.$^7$ .............................. A47C 7/54; B62D 39/00
(52) U.S. Cl. ........................... 297/411.21; 297/411.32; 296/153; 296/1.09
(58) Field of Search ...................... 297/411.21, 411.22, 297/411.32; 296/153, 1.09

(56) References Cited

U.S. PATENT DOCUMENTS 4,619,478 A * 10/1986 Heimnick et al. ..... 297/411.21
5,964,497 A * 10/1999 Wiles .......................... 296/153
6,145,919 A * 11/2000 Mysliwiec et al. ..... 296/153 X
6,253,894 B1   7/2001 Schumann et al.

FOREIGN PATENT DOCUMENTS

| DE | 40 02 242 A1 | 8/1991 |
|---|---|---|
| DE | 41 20 617 C2 | 12/1992 |
| DE | 43 21 335 C2 | 1/1995 |
| DE | 196 53 722 A1 | 7/1998 |
| DE | 195 27 912 A1 | 8/1998 |
| DE | 197 25 899 C2 | 12/1998 |
| DE | 198 31 205 A1 | 1/2000 |
| DE | 198 59 553 C1 | 3/2000 |
| DE | 198 55 285 A1 | 6/2000 |
| DE | 199 29 564 A1 | 1/2001 |
| DE | 199 41 127 A1 | 3/2001 |
| EP | 0 631 901 A1 | 1/1995 |
| FR | 2 755 074 A1 | 4/1998 |

OTHER PUBLICATIONS

English Translation of international Preliminary Examination Report of corresponding International Application No. PCT/DE01/04678, dated Aug. 2, 2002.

International Search Report of PCT/DE01/04678, dated Jun. 4, 2002.

International Preliminary Examination Report of PCT/DE01/04678, dated Aug. 2, 2002.

* cited by examiner

*Primary Examiner*—Anthony D. Barfield
(74) *Attorney, Agent, or Firm*—Christie, Parker & Hale, LLP

(57) ABSTRACT

An adjuster mechanism for setting the height of an armrest on a motor vehicle door includes a drive unit and an adjuster gear arranged after the drive unit, which, on activating the drive unit, performs an adjusting movement for setting the height of the armrest. The adjuster gear for setting the height of the armrest executes a tilting movement of the armrest.

17 Claims, 5 Drawing Sheets

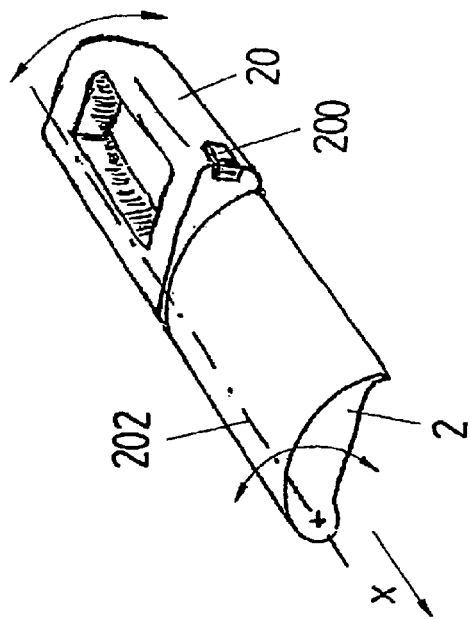
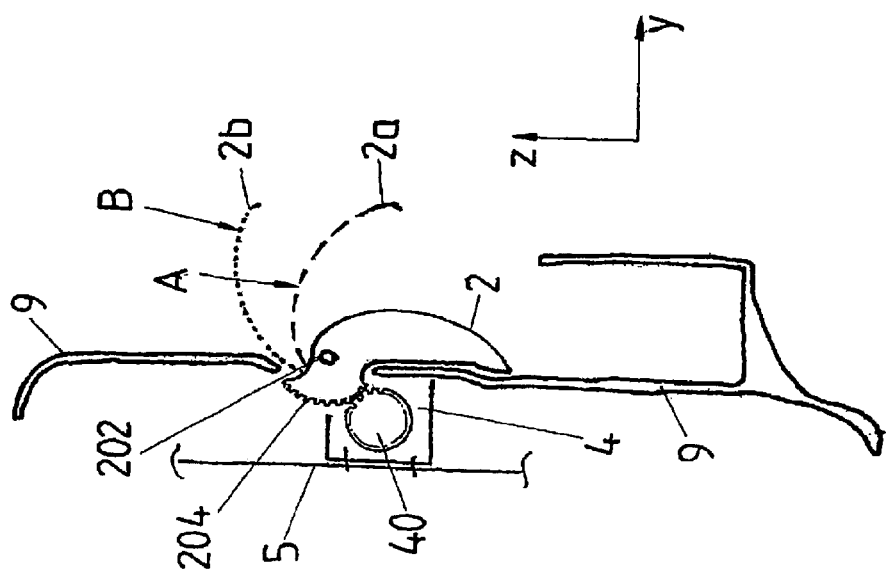
Fig. 1a
Fig. 1b

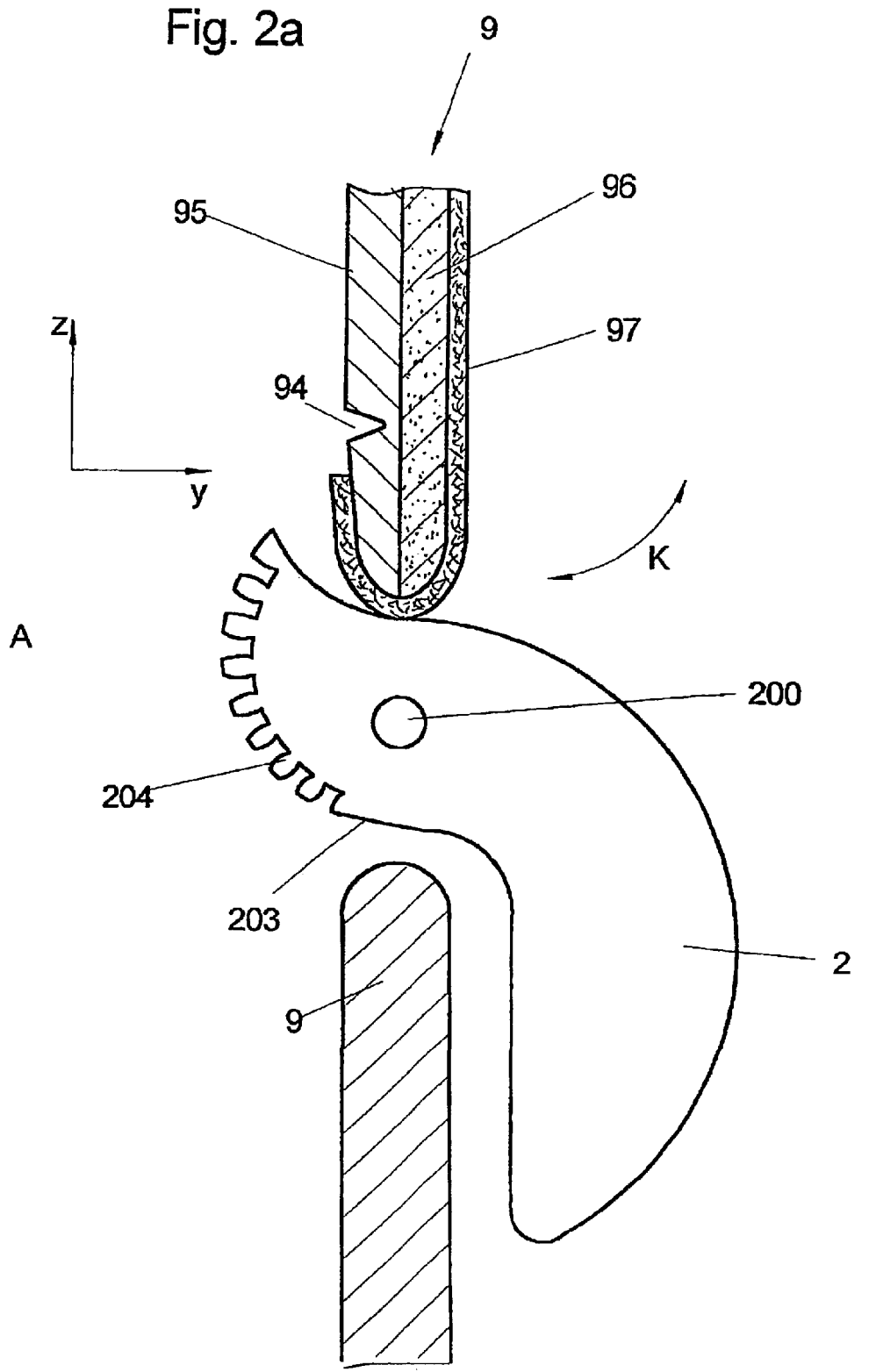

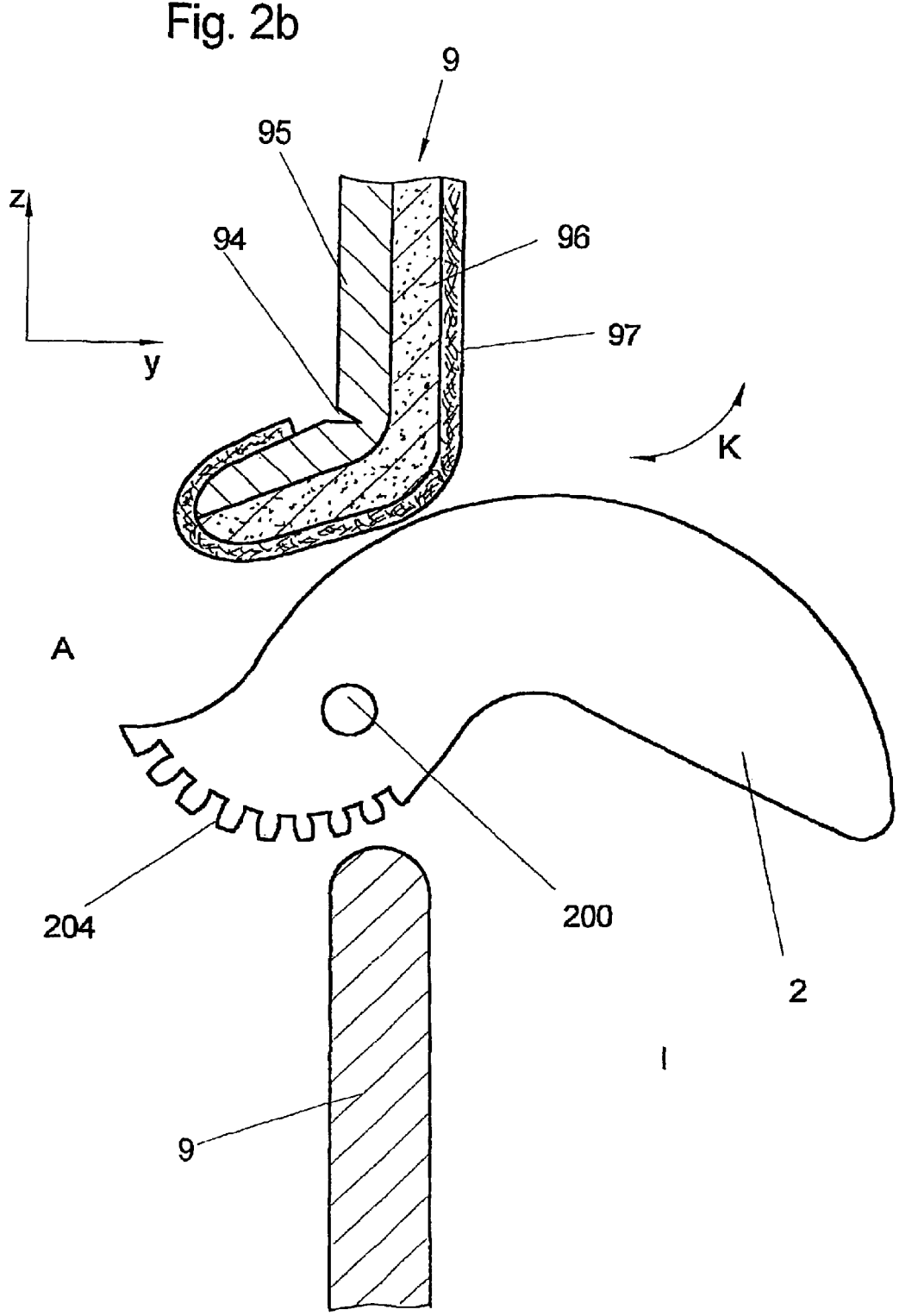

ADJUSTER MECHANISM FOR SETTING THE HEIGHT OF AN ARMREST ON A MOTOR VEHICLE DOOR

CROSS-REFERENCE TO RELATED APPLICATION

This application is a National Phase Patent Application of International Application Number PCT/DE01/04678, filed on Dec. 6, 2001, which claims priority of German Patent Application Number 100 60 857.4, filed Dec. 6, 2000, and German Patent Application Number 101 04 077.6, filed Jan. 29, 2001.

FIELD OF THE INVENTION

The invention relates to an adjuster mechanism for setting the height of an armrest on a motor vehicle door.

BACKGROUND OF THE INVENTION

Known automobile armrest adjuster mechanisms, such as the mechanism disclosed in DE 40 02 242 A1, include a vertically adjustable armrest on the door of a motor vehicle which in order to adjust the height can be moved along two guide rails mounted in the vehicle door and extending in the adjusting direction of the armrest.

SUMMARY OF THE INVENTION

An improved adjuster mechanism includes a drive as well as an adjusting gear which is assigned to the drive so that when the drive is activated it triggers an adjusting movement in order to set the height of the armrest which is mounted on the vehicle door. The height of the armrest (position of the armrest along the vertical vehicle axis) can hereby be adapted to the requirements of the different vehicle occupants.

One object of the invention is to provide a new adjuster mechanism of a simple construction for adjusting the height of an armrest on a motor vehicle.

This is achieved through the provision of an adjuster mechanism having an adjusting gear designed for adjusting the height of the armrest by swiveling the armrest about a swivel axis.

Thus, in one embodiment of the invention, in order to adjust the height of the armrest the armrest is not simply moved along the vertical vehicle axis but rather is swiveled about a swivel axis (running perpendicular to the vertical vehicle axis). The benefits of this embodiment are the small amount of space required and the simple construction of the adjuster mechanism. The guide rails, which are normally used to guide a vertically adjustable armrest, can be omitted if the height of the armrest is set not by sliding along the vertical vehicle axis but by a swivel movement.

In one embodiment the swivel movement is carried out about a swivel axis running parallel to the longitudinal direction of the vehicle (x-axis).

Adjusting the height of an armrest by swiveling leads to the position of the supporting surface of the armrest (the position of that surface on which the arm of the vehicle occupant can be comfortably rested) changing in relation to both the longitudinal direction of the vehicle and the vertical vehicle axis. The armrest is therefore designed so that in any swivel region of the armrest serving as a useful region (a swivel area in which the individual swivel positions of the armrest enable the setting of several armrest positions whereby a vehicle occupant can lean the underarm portion of his arm on the armrest) there is a section of the armrest which is suitable for supporting the arm of a vehicle occupant.

In order to enable the height of the armrest to be adjusted by a swivel movement, the armrest, or at least its supporting section which supports the arm, is formed eccentric relative to the swivel axis.

In one embodiment of the present invention, the armrest is convex in shape so as to provide a suitably positioned supporting surface for the user's arm for each swivel adjustment to the height of the armrest. In a further embodiment, the supporting surface of the armrest forms in a cross-sectional view a section of a spiral.

In order to generate the swivel movement the armrest can be provided with a gearing element which is coupled to the drive of the adjuster mechanism of the armrest. This gearing element can be comprised of a toothed segment which interacts with a gearwheel on the drive side, e.g. a pinion. On the other side the swivel axis of the armrest can be connected rotationally secured to an adjusting lever which in turn is coupled to a drive lever on the drive side.

Because the armrest in the installed state normally protrudes from the inside door trim of the vehicle door towards the interior of the vehicle there is the problem that when the armrest is swiveled in order to adjust its height it could collide with the inside door trim. In order to overcome this the armrest and/or the inside door trim can be provided with a movable and/or elastic section which prevents any collision between the armrest and inside door trim that would otherwise obstruct the swivel action of the armrest. In an example embodiment, a section of the inside door trim can be formed as a folding section (by means of a film hinge) or other suitable means so that it can be moved out of the way of the armrest when a section of the armrest projects into the inside door trim as it swivels round. As an alternative, the corresponding section of the inside door trim can be displaceable and the displacement can be controlled through a slide guide.

The associated sections of the armrest and inside door trim can be elastic in order to give way and not obstruct the swivel movement of the armrest as the section of the armrest projects into the inside door trim.

BRIEF DESCRIPTION OF THE DRAWINGS

Further features and advantages of the invention will become clear from the following description of an embodiment with reference to the drawings in which:

FIG. 1a shows a section through an inside door trim of a vehicle door having an armrest which is vertically adjustable through swivel movement;

FIG. 1b shows a perspective view of the armrest of FIG. 1a;

FIG. 2a shows a modification of the embodiment of FIG. 1a in which a section of the inside door trim adjoining the armrest can be folded inwards;

FIG. 2b shows the embodiment of FIG. 2a where the height of the armrest has been changed;

DETAILED DESCRIPTION OF THE INVENTION

Figure 3:
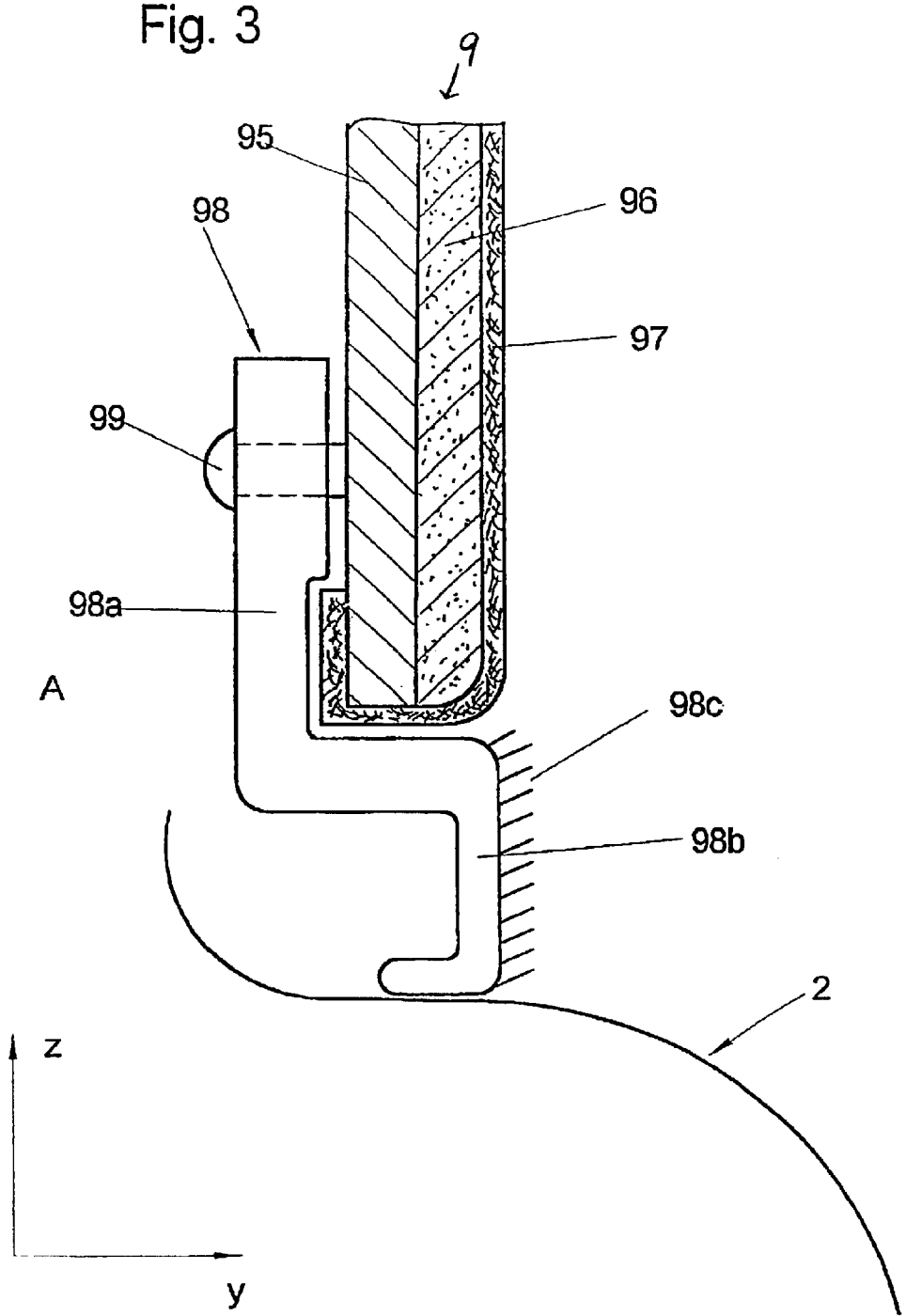
FIG. 3 shows a modification of the embodiment of FIG. 1a in which the inside door trim is elastically deformable in the region of the armrest.

FIG. 1a shows a cross-section of an inside door trim 9 that is fixable on an inside door panel 5 of a motor vehicle door.

The inside door trim 9 serves to cover the inside door panel 5 from the interior of the vehicle and has functional elements such as a card pocket and an armrest 2 (arm support) that protrudes from the inside trim towards the interior of the vehicle. The armrest 2 is vertically adjustable in order to ensure an ergonomic support of the underarm portion of the arm of the user of the armrest 2, adapted to the requirements of each individual vehicle occupant.

Adjusting the height of the armrest 2 by adjusting the supporting face of the armrest 2 along the vertical vehicle axis z, is carried out by swiveling the armrest 2 about a swivel axis 202 that extends in the longitudinal direction of the vehicle (perpendicular to the leaf plane). In order to generate the swivel movement an electrical or manual drive 4 is provided that drives a gearwheel 40 which interacts with a toothed section 204 provided on the armrest 2. This toothed section 204 projects through an opening in the inside door trim 9 into the region between the inside door panel 5 and the inside door trim 9 where the drive 4 that is fixed on the inside door panel 5 is mounted.

In an alternative embodiment, the region of the inside door skin accommodating the drive 4 is formed by a base plate (module support) fitted onto the inside door panel rather than by the inside door panel itself. The different components of a vehicle door-(e.g. the adjusting mechanism of a vertically adjustable armrest, the window lifter) can be prefitted on the base plate outside of the vehicle door.

FIGS. 1a and 1b show an armrest 2 the height of which is adjusted by swiveling the armrest 2 about an axis 202 that points substantially in the drive direction x. To this end the outer supporting contour of the armrest starting from the swivel axis 202 has an eccentric or spiral-shaped contour. The swivel axis 202 lies in the region of the plane of the inside door trim 9.

FIG. 1a shows the armrest 2 located in the fold-down position which allows good access and insight into the stowage compartment or card pocket. The dash-lined contour shows a lower to middle height of the armrest 2a where the arm is supported in the region of arrow A. An upper position of the armrest 2b is shown by the dotted-line contour with the supporting face in the region of the arrow B. When the armrest 2 is adjusted upwards by swiveling the armrest 2 about its swivel axis 202 the surface area of the armrest serving in each position as the supporting surface is moved both upwards with a component along the vertical vehicle axis z and also moves with a component of movement along a direction y pointing towards the inside I of the vehicle.

FIG. 1b shows an alternative embodiment where the adjustment to the armrest is carried out manually, in this case by a step switch mechanism operated by a grab handle 20 of the vehicle door that serves as the drive element. The grab handle 20 should be mounted capable of swiveling about the same axis 202 or an axis running parallel thereto and lockable in its neutral position. Swiveling the handle 20 upwards triggers a swivel movement of the armrest 2 in the same direction and raises the supporting surface. The supporting surface of the armrest is lowered back down in an analogous manner.

FIG. 2a shows a modification of the embodiment of FIG. 1a regarding the configuration of the inside door trim 9 in a region above the armrest 2. It can be seen from FIG. 2a that the inside door trim 9 has three layers above the armrest 2, namely a support 95 made of plastics, a foam layer 96 mounted facing the inside of the vehicle as well as a textile covering 97 that covers the inside door trim 9 facing the inside I of the vehicle. The inside door trim 9 shown diagrammatically in FIG. 1a can be formed in a corresponding manner above the armrest 2. The region of the inside door trim 9 underneath the armrest 2 (which generally may have a card pocket as in FIG. 1a) is normally of a simpler design given the fewer demands on the design in this area. It is also possible for this region of the inside door trim to have a multi-layered construction.

FIG. 2a also shows the region of the inside door trim 9 above the armrest 2 having a wedged recess 94 in the support 95 forming a film hinge so that the section of the inside door trim located between the film hinge and the armrest 2 can be folded towards the outside space A of the vehicle by applying external forces about the axis defined by the film hinge.

This makes it possible for the inside door trim 9 to be brought from above directly down to the armrest 2 in order to avoid visible gaps impairing the design, and for the inside door trim 9 not to impede the swivel action of the armrest 2 but rather—as shown in FIG. 2b—to give way during swiveling of the armrest 2 through the folding movement K. Because of the ability of the section of the inside door trim 9 mounted underneath of the film hinge to fold as shown in FIG. 2b during swivel movement of the armrest 2 corresponding to adjusting the height of the armrest 2 along the vertical vehicle axis z, a collision is prevented between the inside door trim 9 and armrest 2, that would oppose further swiveling of the armrest 2.

Referring again to FIG. 2a, regarding the region of the inside door trim 9 extending underneath the armrest 2, a folding configuration is not as necessary because the area 203 of the armrest 2 adjoining here need not be ergonomically designed. The area 203 can be designed with enough clearance so that collision with the inside door trim 9 during swivel movement of the armrest 2 is avoided. The area 203 of the armrest 2 is thus formed as a circular section having its center on the swivel axis 202 of the armrest 2.

FIG. 3 shows a an alternate embodiment that enables the inside door trim 9 to give way as the armrest 2 swivels. To this end the section of the inside door trim 9 adjacent the armrest 2 at the top is formed as an elastic element in the form of a rubber strip 98 that has a fixing area 98a for fixing on the inside door trim 9 as well as a design area 98b that forms a part of the inside door trim 9 and extends up to the armrest 2.

The fixing area 98a extends on the side of the inside door trim 9 facing away from the inside I of the vehicle and is connected there to the support 95 of the inside door trim 9 by a welded rivet 99. The design area 98b of the rubber strip 98 is designed to be elastically deformable and for design reasons is provided with a covering 98c. As the armrest 2 swivels in order to be adjusted upwards along the vertical vehicle axis z the design section 98b of the rubber strip 98 is forced in a direction away from the inside I of the vehicle so that swivel movement of the armrest 2 is not impeded.

In an alternative embodiment the corresponding section of the arm rest 2 could also be designed to be elastically deformable.

Figure 4:
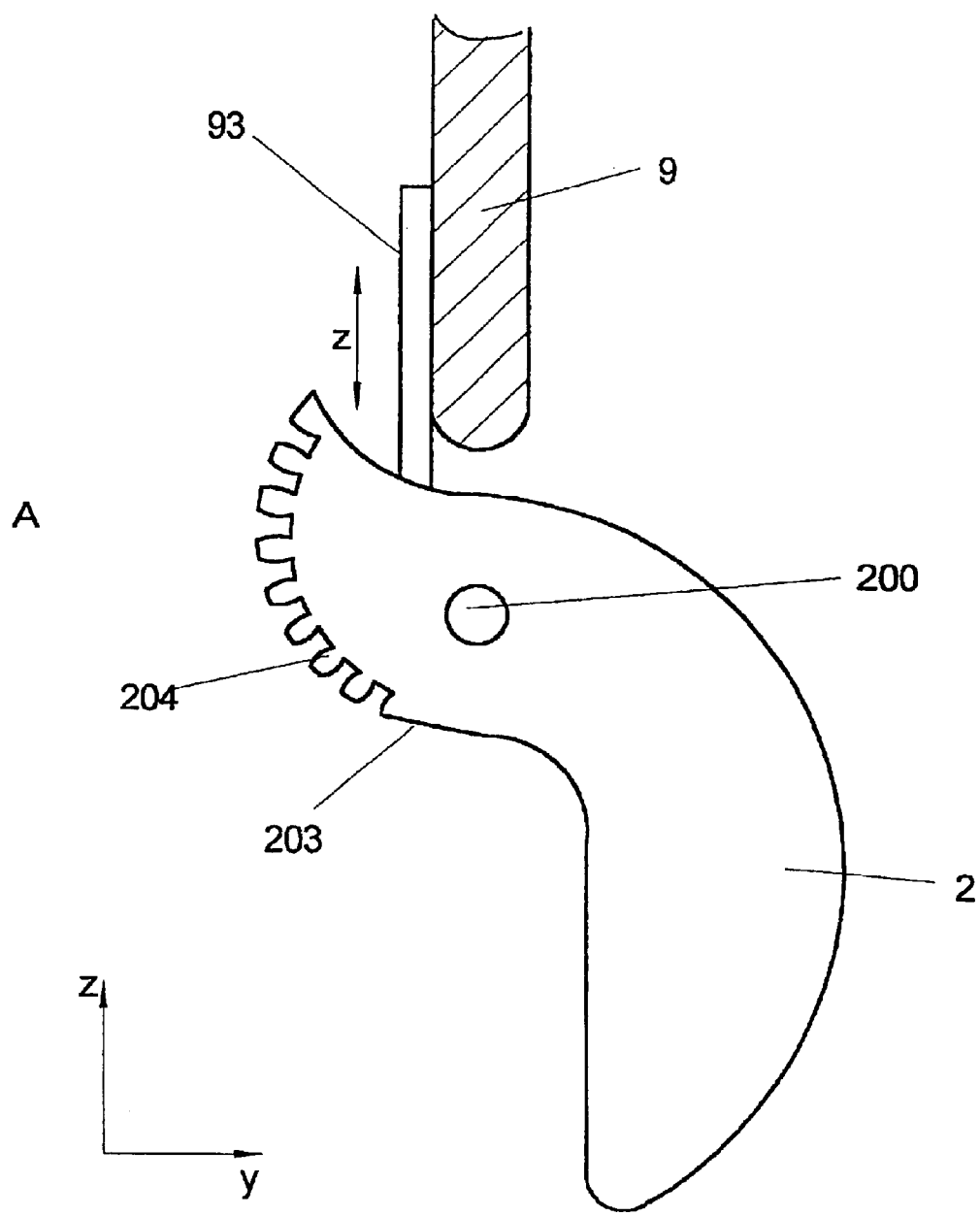
FIG. 4 shows a modification of the embodiment of FIG. 1a in which the inside door trim has a displaceable section in the region of the armrest.

FIG. 4 shows an alternative embodiment in which the section of the inside door trim 9 that adjoins the armrest 2 at the top is designed as a fascia 93 which can be moved along the vertical vehicle axis z. During swivel movement of the armrest 2 the fascia 93 is displaceable along the vertical vehicle axis z so that collision with the armrest 2 is avoided. The movement of the fascia 93 can be matched with the swivel movement of the armrest 2 with suitable coupling elements, for example by controlling the fascia 93 by sliding guide discs.

As the armrest 2 is swiveled the fascia 93 is displaced so that the swivel movement of the armrest 2 is not prevented. The placement and articulation of the fascia is such that as far as possible no visible gaps appear between the inside door trim 9 and the armrest 2.

What is claimed is:

1. An adjuster mechanism for adjusting the height of an armrest on a vehicle door, comprising:
   a drive;
   an adjusting gear mounted on an output side of the drive; and
   an armrest;
   wherein the adjusting gear is engaged by the drive to trigger a swivel movement of the armrest in order to adjust the height of the armrest when the drive is activated;
      wherein the swivel movement of the armrest takes place in relation to an installed state of the adjuster mechanism in a vehicle door about a swivel axis running in a longitudinal vehicle direction; and
      wherein the armrest has a surface designed to support an arm of a vehicle occupant, said surface being at least one of a convex surface eccentrically formed relative to the swivel axis, and a surface forming a section of a spiral in cross-section.

2. The adjuster mechanism of claim 1, wherein the vehicle door has an inside door trim attached thereto and the axis running in the longitudinal vehicle direction runs in a plane shared with the inside door trim.

3. The adjuster, mechanism of claim 1, wherein at each of a set of swivel positions of the armrest comprising a range of useful swivel positions, a section of the armrest is positioned for supporting an arm of a vehicle occupant.

4. The adjuster mechanism of claim 3, wherein the section of the armrest serving to support an arm of a vehicle occupant is moved in the direction of the inside of the vehicle as the height of adjustment of the armrest increases.

5. The adjuster mechanism of claim 1, wherein a gearing element provided on the armrest is coupled to the adjusting gear which can be driven by the drive in order to generate swivel movement of the armrest.

6. The adjuster mechanism of claim 5, wherein the gearing element provided on the armrest is comprised of a toothed segment.

7. The adjuster mechanism of claim 1, wherein the vehicle door has an in side door trim attached thereto and the armrest in an installed state protrudes from the inside door trim in the direction of the inside of the vehicle.

8. An adjuster mechanism for adjusting the height of an armrest on a vehicle door, comprising:
   a drive;
   an adjusting gear mounted on an output side of the drive; and
   an armrest;
   wherein the adjusting gear is engaged by the drive to trigger a swivel movement of the armrest in order to set the height of the armrest;
   wherein the armrest in an installed state protrudes from the inside door trim in the direction of the inside of the vehicle; and
   wherein at least one of the armrest and the inside door trim includes at least one of a movable and an elastic section in order to avoid, as the armrest swivels, a blocking action between the armrest and the inside door trim which would oppose the swivel movement.

9. The adjuster mechanism of claim 8, wherein a section of the inside door trim adjoining the armrest is designed to be folding.

10. The adjuster mechanism of claim 9, wherein the section of the inside door trim designed to be folding is connected through a hinge to a further region of the inside door trim.

11. The adjuster mechanism of claim 8, wherein a section of the inside door trim adjoining the armrest is displaceable.

12. The adjuster mechanism of claim 8, wherein the section provided on at least one of the inside door trim adjoining the armrest and a section of the armrest adjoining the inside door trim is elastically deformable.

13. The adjuster mechanism of claim 10, wherein the hinge is a film hinge.

14. The adjuster mechanism of claim 1, wherein the armrest has a surface designed to support an arm of a vehicle occupant and a swivel axis, said surface being both a convex surface eccentrically formed relative to the swivel axis and forming a section of a spiral in cross-section.

15. The adjuster mechanism of claim 8, wherein the section is both a moveable and an elastic section.

16. The adjuster mechanism of claim 8, wherein the section is provided on both the armrest and the inside door trim.

17. The adjuster mechanism of claim 12, wherein sections provided on both the inside door trim adjoining the armrest and a section of the armrest adjoining the inside door trim are elastically deformable.

* * * * *